(12) United States Patent
Jacobs et al.

(10) Patent No.: US 6,932,357 B2
(45) Date of Patent: Aug. 23, 2005

(54) GEAR REDUCING COLLET NUT ASSEMBLY

(75) Inventors: Barry Howard Jacobs, Forest Park, IL (US); Timothy D. Baker, Roselle, IL (US)

(73) Assignee: Credo Technology Corporation, Broadview, IL (US)

( * ) Notice: Subject to any disclaimer, the term of this patent is extended or adjusted under 35 U.S.C. 154(b) by 148 days.

(21) Appl. No.: 10/435,441

(22) Filed: May 9, 2003

(65) Prior Publication Data

US 2004/0222600 A1 Nov. 11, 2004

(51) Int. Cl.$^7$ .............................................. B23B 31/165
(52) U.S. Cl. .............................. 279/42; 279/52; 279/56
(58) Field of Search .............................. 279/42, 48, 49, 279/52, 53, 56, 59, 69; B23B 31/165, 31/169

(56) References Cited

U.S. PATENT DOCUMENTS

| | | | | |
|---|---|---|---|---|
| 892,927 A | * | 7/1908 | Bemis .......................... | 408/45 |
| 1,115,310 A | * | 10/1914 | Halvorsen-Pande ......... | 408/240 |
| 1,835,194 A | * | 12/1931 | Whiton ........................ | 279/119 |
| 2,326,322 A | * | 8/1943 | Bell ............................. | 279/53 |
| 3,499,657 A | * | 3/1970 | Giraud et al. ................ | 279/114 |
| 4,167,062 A | * | 9/1979 | Page et al. ................... | 433/129 |
| 4,260,169 A | * | 4/1981 | Hall ............................. | 279/62 |
| 4,275,893 A | * | 6/1981 | Bilanceri ..................... | 279/64 |
| 4,305,597 A | * | 12/1981 | McCarty ...................... | 279/22 |
| 4,663,203 A | * | 5/1987 | Coffin, Sr. ................... | 428/12 |
| 4,718,682 A | * | 1/1988 | Zilic et al. ................... | 279/116 |
| 4,758,006 A | * | 7/1988 | Hiestand ..................... | 279/4.12 |
| 5,143,686 A | * | 9/1992 | Shimizu ...................... | 279/110 |
| 5,215,507 A | * | 6/1993 | Bonig ......................... | 475/331 |
| 5,567,100 A | | 10/1996 | Nakamura | |
| 5,577,872 A | | 11/1996 | Nakamura | |
| 5,934,853 A | | 8/1999 | Junkers | |
| 5,944,327 A | | 8/1999 | Kanaan | |
| 6,050,741 A | | 4/2000 | Aultman et al. | |
| 6,079,916 A | * | 6/2000 | Grayson et al. ............ | 409/182 |
| 6,179,512 B1 | | 1/2001 | Gibson et al. | |
| 6,261,041 B1 | | 7/2001 | Nakamura | |

FOREIGN PATENT DOCUMENTS

SU          653437          3/1979

* cited by examiner

*Primary Examiner*—Derris H. Banks
*Assistant Examiner*—Michael W. Talbot
(74) *Attorney, Agent, or Firm*—Gardner Carton & Douglas LLP

(57) ABSTRACT

A gear reducing collet nut assembly is provided for holding a tool bit. The assembly includes an outer grip sleeve that can be rotated to actuate a clamping structure with a bore for holding a tool bit. More specifically, the assembly includes a planetary gear system to amplify torque from the grip sleeve to facilitate effective manual operation. The assembly includes a base member that is securable to a shaft of a rotary power tool, and the planetary gears are rotatably mounted at a plurality of positions on the base member. The planetary gears are driven by a central sun gear that is fixed to the grip sleeve. The planetary gears deliver torque to a ring gear that extends peripherally around the planetary gears. Movement of the ring gear is effective to actuate the clamping structure. In an embodiment, an exterior of the ring gear is threaded to the base member and axially fixed relative to the grip sleeve. As a result, rotation of the outer sleeve causes axial translation of the sun gear, which has a tapered surface that acts against the clamping structure to selectively constrain or release a tool from an axial bore in the clamping structure.

9 Claims, 4 Drawing Sheets

GEAR REDUCING COLLET NUT ASSEMBLY

FIELD OF THE INVENTION

This invention generally relates to rotary power tools and more particularly relates to a torque enhancing collet nut for holding an interchangeable tool bit.

BACKGROUND OF THE INVENTION

Chucks and collet nuts are generally known devices that are mounted to a shaft of a rotary tool for holding a replaceable tool or bit. Some such devices have torque enhancing structures to permit secure tightening by hand. While existing collet nuts are useful, a need exists for an improved collet nut assembly.

BRIEF SUMMARY OF THE INVENTION

The invention generally provides a collet nut assembly including a planetary gear system that facilitates hand tightening, thereby avoiding a need for a wrench. The assembly includes an outer sleeve that includes an integral, centrally positioned sun gear. The assembly also includes a base member having a central threaded bore configured to be threaded onto an output shaft of a rotary power tool. A plurality of planet gears are rotatably mounted to the base member, and each of the planet gears is in driving engagement with the sun gear. A ring gear is rotatably mounted within the outer sleeve, coaxially with the sun gear, the ring gear also being engaged with each of the planet gears.

An embodiment of the invention provides a collet nut assembly for holding a tool bit, the collet nut assembly adapted to be mounted to a shaft of a rotary power tool that rotates on a central axis; the collet nut assembly comprising: a base member adapted to be mounted to the shaft; a plurality of planet gears rotatably mounted to the base member, each of the planet gears radially spaced from the central axis; a sun gear positioned on the axis in a central driving engagement relative to the plurality of planet gears; a ring gear extending around the planet gears so that each of the planet gears is drivably engaged with an interior side of the ring gear; a grip sleeve rotatably mounted to the ring gear for rotation about the central axis relative to the base member, the sun gear fixed axially within the grip sleeve; wherein rotation of the sun gear rotatably drives the planet gears; and a clamping structure having a tool bore for shaped to receive tool tool bit, the clamping structure being actuatable by motion of the ring gear to selectively clamp or release the tool bit from the axial tool bore.

In an embodiment, the ring gear is threadably engaged with the base member so that rotation of the ring gear about the axis relative to the base member results in axial displacement of the ring gear relative to the base member.

In an embodiment, the base member includes: a central mounting portion having a mounting bore shaped to receive an end of the shaft; a generally planar web portion extending radially outwardly from the mounting portion; and an annular wall portion projecting forwardly from the generally planar web portion, the annular wall having an inwardly facing surface with threads mated with threads on a peripheral surface of the ring gear.

In an embodiment, the central mounting portion includes a threaded bore adapted to receive a threaded portion of the shaft.

In an embodiment, the clamping structure includes: a collet tube having an axial bore to receive a tool bit; and a clamping member mounted to move axially with the ring gear, the clamping member in tapered contact against an exterior of the collet tube so that axial motion of the clamping member is operable to selectively constrict or expand the collet tube. More specifically, in an embodiment, the collet tube has a tapered exterior.

In an embodiment, an outer circumference of the ring gear has an external left-hand thread which mates to an internal left-hand thread on the base member.

In an embodiment, the grip sleeve includes an annular sleeve portion and a radial wall portion that extends across an end of the sleeve portion, wherein the sun gear is centrally mounted to the radial wall portion.

In an embodiment, the sun gear is integrally connected to the grip sleeve.

An advantage of the present invention is that it provides a collet nut assembly that amplifies exteriorly applied torque to a clamping force for holding a tool bit. As a result, a user can manually apply a force suitable to clamp or loosen the assembly for selectively inserting, removing or replacing a tool bit.

Another advantage of the present invention is that it provides a collet nut assembly that is compact.

A further advantage of the present invention is that it provides a collet nut assembly that occupies a minimal axial distance.

Yet another advantage of the present invention is that it provides a collet nut assembly that is mountable to a shaft of a rotary power tool with a minimal gap from a housing of the power tool.

These and other advantages of the invention, as well as additional inventive features, will be apparent from the description of the invention provided herein.

DETAILED DESCRIPTION OF THE INVENTION

Figure 1:
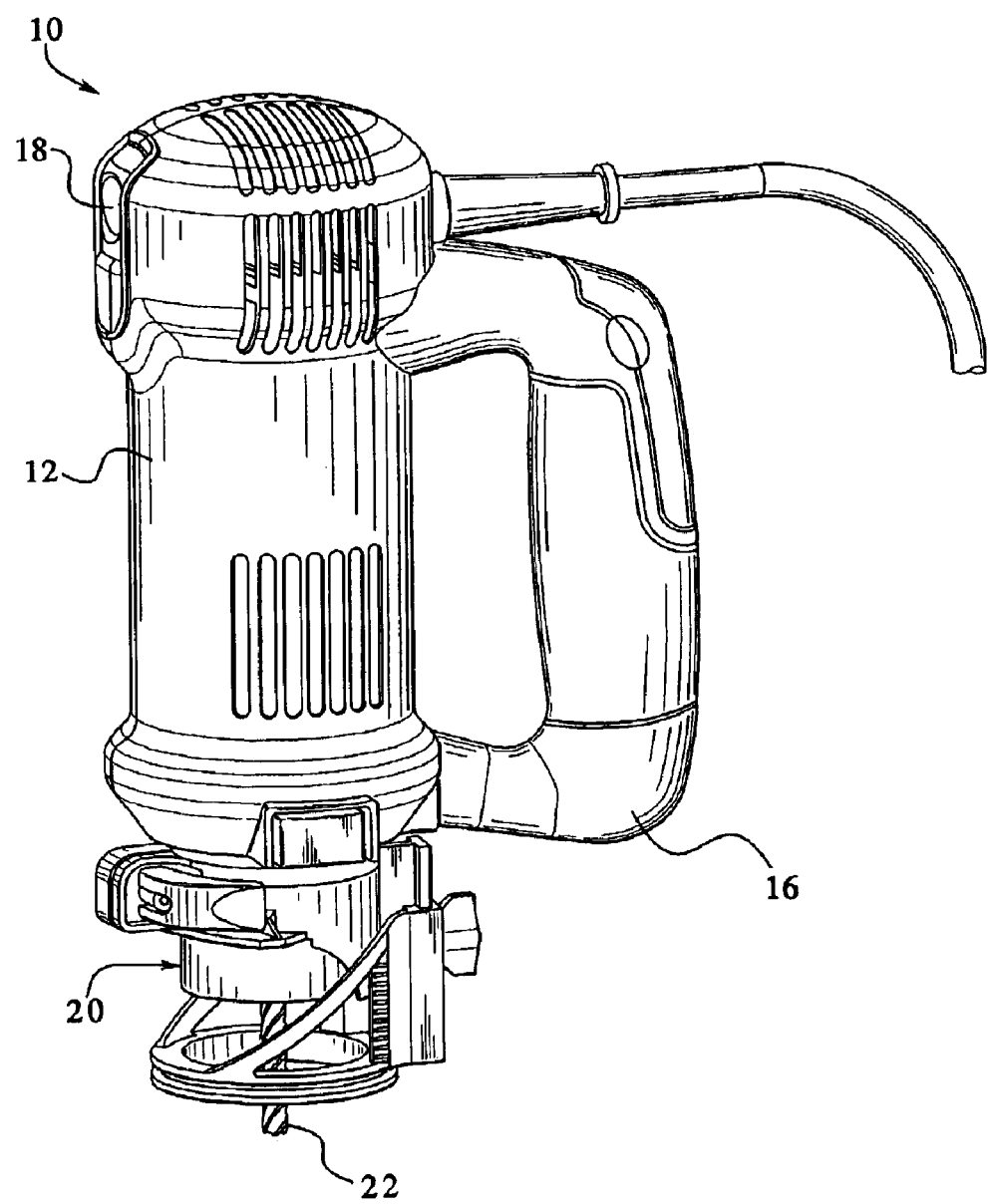
FIG. 1 is a perspective view of a rotary power tool equipped with a collet nut assembly having features in accordance with teachings of the present invention.
Figure 2:
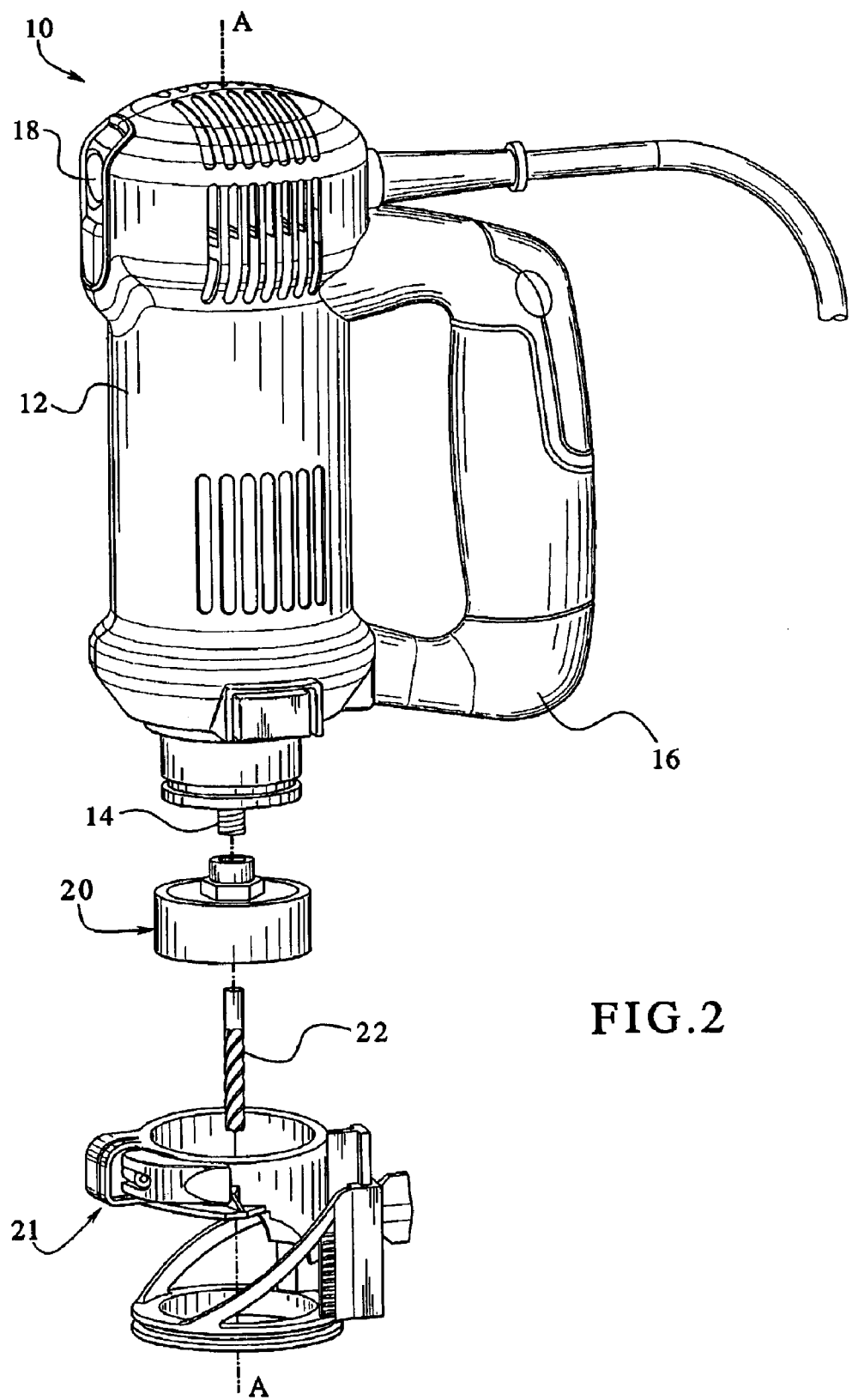
FIG. 2 is a perspective view of the rotary power tool of FIG. 1, with some components exploded away to show collet nut assembly.

Now turning to the drawings, wherein like numerals designate like components, FIGS. 1 and 2 illustrate a rotary power tool 10 having a housing 12. The housing 12 contains an electric motor (not shown) operable to rotatably drive a shaft 14, illustrated in FIG. 2, which rotates about an axis A. As illustrated, the housing 12 is shaped to include an optional handle 16 to be gripped by a user and a switch 18 that selectively actuates the motor.

As shown in FIGS. 1 and 2, the rotary power tool 10 is a rotary cutter that includes a depth guide 21 to permit adjustable positioning of a tool bit 22. The depth guide 21 is shown exploded away from the housing 12 in FIG. 2 to show a gear reducing collet nut assembly 20, which is also illustrated in FIGS. 2–5. In the manner shown in FIG. 2, the collet nut assembly 20 is adapted to be mounted to the shaft 14 of the power tool 10. The collet nut assembly 20 is operable to securely hold a tool bit 22 to be driven by the rotary power tool 10.

The rotary power tool 10 can be a tool other than the illustrated rotary cutter, and accordingly, illustrated the tool bit 22 is shown as a spiral saw bit. Such a configuration is illustrated by way of example only. As those skilled in the art will recognize, the collet nut assembly 20 can be used to hold any other type of rotating tool bit, such a grinding tool, router bit, milling tool, wire brush, buffer pad, screwdriver bit, boring tool, socket, drill, or any other type of tool adapted to operate with a rotary motion.

Figure 3:
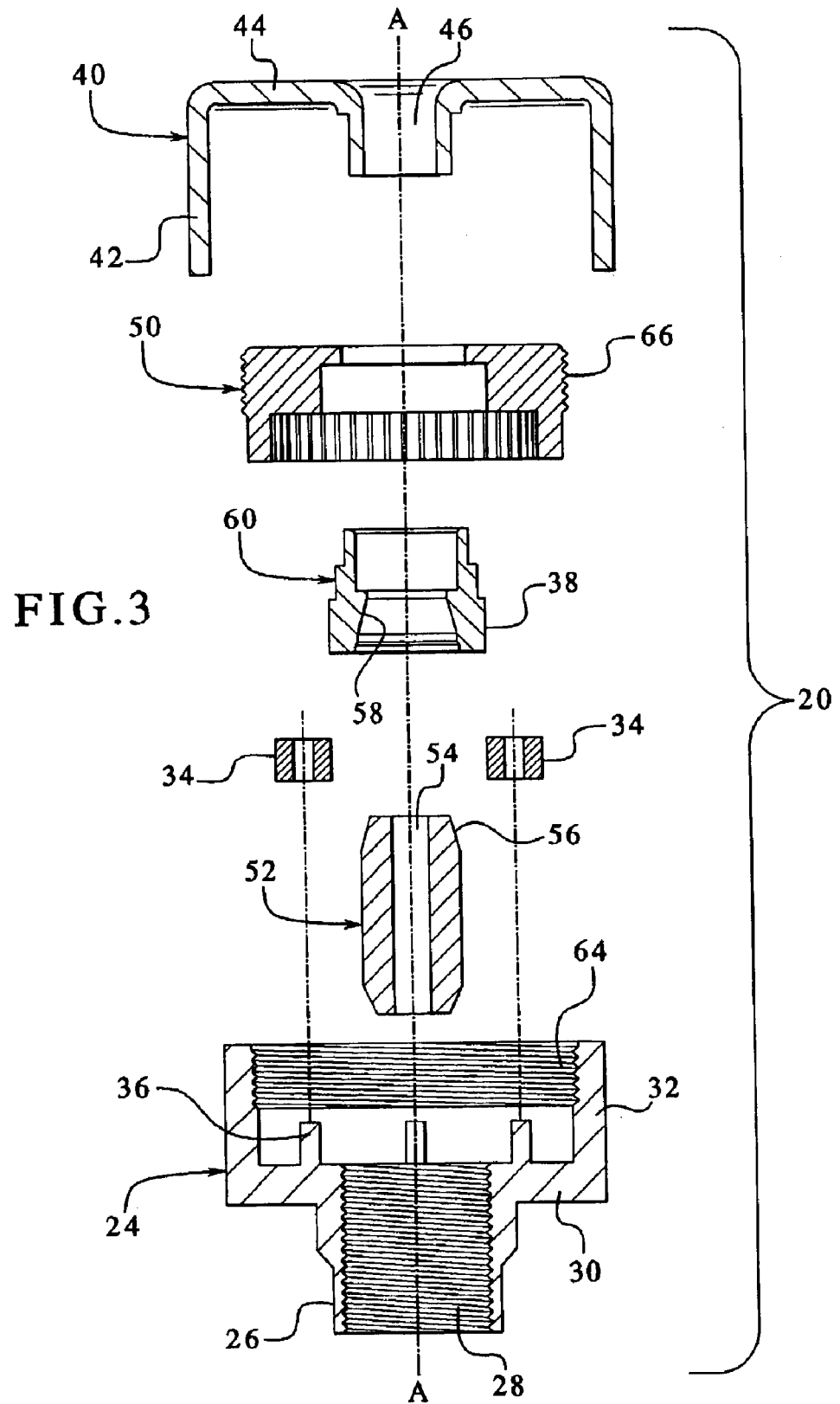
FIG. 3 is an exploded side sectional elevation of the collet nut assembly of FIG. 1
Figure 4:
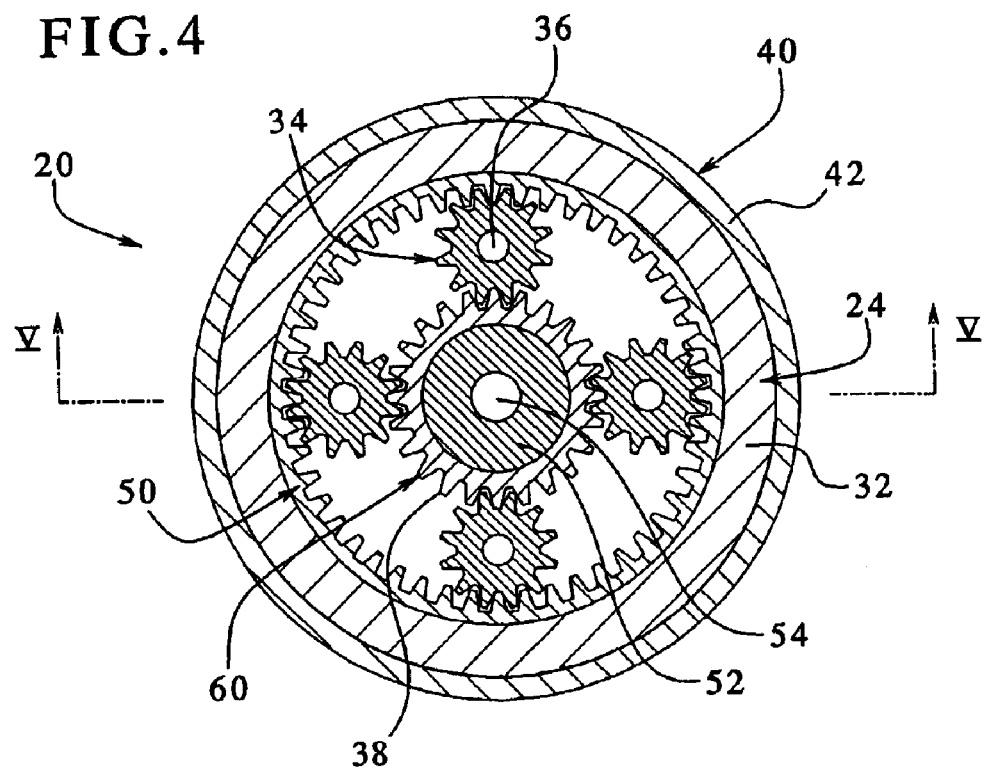
FIG. 4 is a sectional view of the collet nut assembly as taken generally along line IV–IV of FIG. 5.
Figure 5:
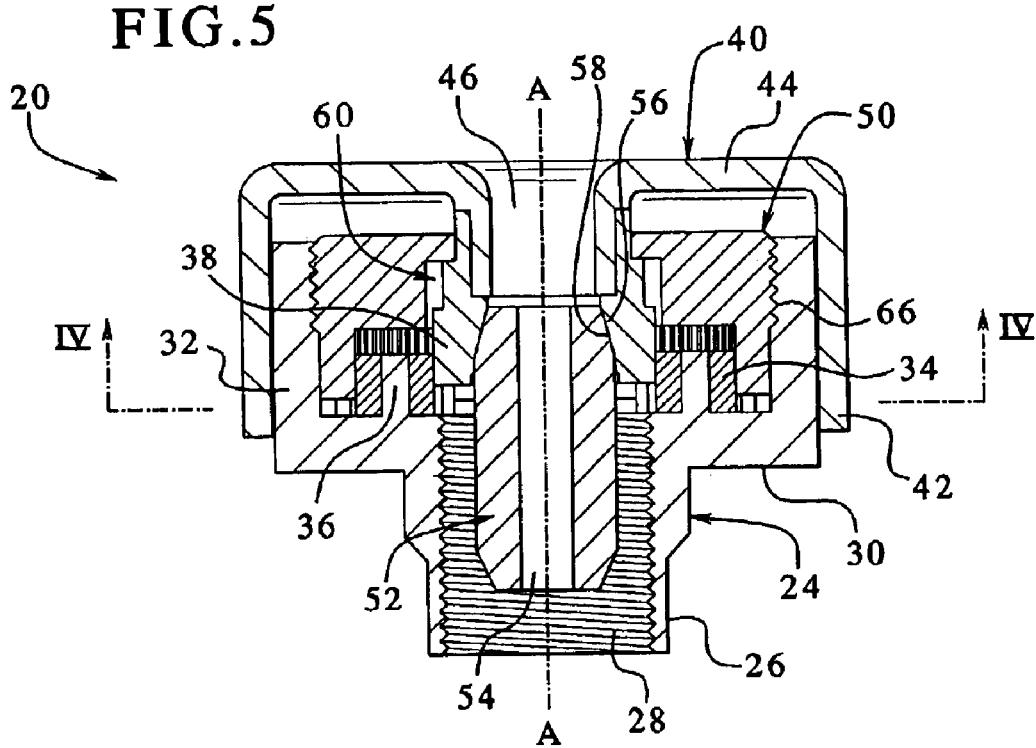
FIG. 5 is a sectional view of the collet nut assembly as taken generally along line V–V of FIG. 4.

Turning to FIGS. 3–5, the collet nut assembly 20 includes a base member 24 adapted to be mounted to the shaft 14 (FIG. 2). As illustrated in FIGS. 3 and 4, the base member 24 includes, for example, a central mounting portion 26 having a threaded mounting bore 28 to matably receive a threaded end of the shaft. Those of skill in the art will understand that the base portion 24 could alternatively include any other type of mounting structure suitable for mounting to the shaft 14. The base portion includes a generally planar web portion 30 which extends radially outwardly from the mounting portion 26, and an annular wall portion 32 projects in a forward direction from the generally planar web portion 30, away from the rotary power tool.

Planet gears 34 are rotatably mounted to the base member 24. Each of the planet gears 34 is radially spaced from the central axis A, and each of the planet gears rotates on an axis parallel to the central axis A. In the embodiment illustrated in FIGS. 3–5, the base member 24 includes a plurality of parallel pegs 36 projecting in a forwardly direction from the web portion 30. Each of the pegs 36 is received through a center hole of a respective one of the planet gears 34, permitting the planet gear to rotate on the peg.

Still referring to FIGS. 3–5, the collet nut assembly 20 includes a sun gear 38 aligned on the central axis A in a driving engagement relative to each of the planet gears 34. More specifically, the sun gear 38 has an exterior periphery with teeth that mesh with teeth of each respective planet gears 34.

In order for a user to rotate the sun gear 38, the collet nut assembly 20 includes a grip sleeve 40. The sun gear 38 is centrally fixed to the grip sleeve 40. Referring to FIGS. 3 and 4, the grip sleeve 40 includes a generally cylindrical portion 42 and a radial wall portion 44. A tool bore 46 is disposed through the grip sleeve 40 at a central position aligned on the axis A for receiving the tool bit. The grip sleeve 40 is configured to generally act as an exterior casing of the collet nut assembly 20 to be gripped by a user and, as described in greater detail below, to rotate relative to the base member and to actuate a clamping or release of the tool bit.

The collet nut assembly 20 also includes a ring gear 50 which extends around the planet gears 34. The ring gear 50 has inwardly facing teeth, so that each of the planet gears is drivably engaged with an interior side of the ring gear. Rotation of the sun gear 38 rotatably drives the planet gears 34.

According to an aspect of the invention, the collet nut assembly includes a clamping structure having a tool bore shaped to receive tool tool bit, wherein the clamping structure is actuatable by motion of the ring gear to selectively clamp or release the tool bit from the axial tool bore. In the exemplary embodiment of FIGS. 3 and 4, the clamping structure includes a collet tube 52 having an axial bore 54, which, as mentioned, is shaped to receive a tool bit. In an embodiment, the collet tube 52 has an annular, tapered exterior surface 56, and the sun gear 38 includes a central bore that has a tapered interior wall 58, thereby defining a clamping member 60. The tapered interior wall 58 acts against the tapered exterior surface 56 of the collet tube 52. The collet tube 52 has a rearward end that abuts an end of the shaft, thereby holding the collet tube 52 at a fixed position. The clamping member 60 is mounted to move axially with the ring gear 50, the clamping member in tapered contact against an exterior of the collet tube 52 so that axial motion of the clamping member 60 is operable to selectively constrict or expand the collet tube. Alternative embodiments are possible wherein the clamping member is a component separate from the sun gear.

In order to cause the clamping member 60 to move axially relative to the clamping tube, the annular wall portion 32 of the base member 24 has an inwardly facing surface with inner left-hand threads 64 that mate with external left-hand threads 66 on an outer circumference of the ring gear 50. As a result, rotation of the ring gear 50 about the axis relative to the base member 24 results in axial displacement of the ring gear relative to the base member.

Rotation of the grip sleeve 40 relative to the base member 24 is effective to clamp or release the clamping member 60 from the collet tube 52. The sun gear 38 is integrally connected to the grip sleeve 40. As a result, a user can rotate the grip sleeve 40 relative to the base member 24 in order to provide a rotational driving input force to the gears 34, 38, and 50. More specifically, rotation of the grip sleeve 40 causes a like angular displacement of the sun gear 38 that drives the planetary gears 34, which in turn drive the ring gear 50 in a direction of rotation opposite the sun gear. The threads 64, 66 hold the ring gear 50 fixed in an axial position relative to the base member 24 at a given relative rotational position. Additionally, the axial position of the ring gear 50 changes with respect to the base member 24 as the ring gear 50 is rotated.

The axial adjustment of the ring gear 50 is effective to also displace the sun gear 38 and thus the clamping member 60 in the axial direction. As the ring gear 50 turns in a counter-clockwise direction (i.e., a typical driving direction of rotation of the rotary power tool) the left-hand threads cause the ring gear to travel in a rearward direction toward the rotary tool 10 (FIGS. 1 and 2). Because the ring gear is axially fixed with respect to the sun gear, the sun gear also travels rearward, thereby compressing the collet tube 52 within the clamping member 60 formed by the tapered bore in the sun gear. An advantage of the invention is that it amplifies torque so that a typical user can sufficiently tighten and loosen the collet nut assembly by hand to secure and release a bit without the need for a wrench.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

In view of the wide variety of embodiments to which the principles of the present invention can be applied, it should be understood that the illustrated embodiments are exemplary only, and should not be taken as limiting the scope of the present invention.

What is claimed is:

1. A collet nut assembly adapted for holding a tool bit, the collet nut assembly adapted to be mounted to a shaft of a rotary power tool that rotates on a central axis, the collet nut assembly comprising:
   a base member adapted to be mounted to the shaft;
   a plurality of planet gears rotatably mounted to the base member, each of the planet gears radially spaced from the central axis;
   a sun gear positioned on the axis in a central driving engagement relative to the plurality of planet gears, wherein rotation of the sun gear rotatably drives the planet gears;
   a ring gear extending around the planet gears so that each of the planet gears is drivably engaged with an interior side of the ring gear;
   a grip sleeve rotatably mounted to the ring gear for rotation about the central axis, the sun gear fixed axially within the grip sleeve; and
   a clamping structure having a tool bore shaped to receive a tool bit, the clamping structure being actuatable by motion of the ring gear to selectively clamp or release the tool bit from the axial tool bore;
   wherein the ring gear is threadably engaged with the base member so that rotation of the ring gear about the axis relative to the base member results in axial displacement of the ring gear relative to the base member.

2. The collet nut assembly of claim 1, wherein the base member includes:
   a central mounting portion having a mounting bore shaped to receive an end of the shaft;
   a generally planar web portion extending radially outwardly from the mounting portion; and
   an annular wall portion projecting forwardly from the generally planar web portion, the annular wall having an inwardly facing surface with threads mated with threads on an outwardly facing peripheral surface of the ring gear.

3. The collet nut assembly of claim 2, wherein the central mounting portion includes a threaded bore adapted to receive a threaded portion of the shaft.

4. A collet nut assembly adapted for holding a tool bit, the collet nut assembly adapted to be mounted to a shaft of a rotary power tool that rotates on a central axis, the collet nut assembly comprising:
   a base member adapted to be mounted to the shaft;
   a plurality of planet gears rotatably mounted to the base member, each of the planet gears radially spaced from the central axis;
   a sun gear positioned on the axis in a central driving engagement relative to the plurality of planet gears, wherein rotation of the sun gear rotatably drives the planet gears;
   a ring gear extending around the planet gears so that each of the planet gears is drivably engaged with an interior side of the ring gear;
   a grip sleeve rotatably mounted to the ring gear for rotation about the central axis, the sun gear fixed axially within the grip sleeve; and
   a clamping structure having a tool bore shaped to receive a tool bit, the clamping structure being actuatable by motion of the ring gear to selectively clamp or release the tool bit from the axial tool bore, wherein the clamping structure includes:
   a collet tube having an axial bore to receive a tool bit; and
   a clamping member mounted to move axially with the ring gear, the clamping member in tapered contact against an exterior of the collet tube so that axial motion of the clamping member is operable to selectively constrict or expand the collet tube.

5. The collet nut assembly of claim 4, wherein the collet tube has an annular, tapered exterior surface.

6. The collet nut assembly of claim 5, wherein the sun gear includes a central bore having a tapered interior wall defining the clamping member.

7. A collet nut assembly adapted for holding a tool bit, the collet nut assembly adapted to be mounted to a shaft of a rotary power tool that rotates on a central axis, the collet nut assembly comprising:
   a base member adapted to be mounted to the shaft;
   a plurality of planet gears rotatably mounted to the base member, each of the planet gears radially spaced from the central axis;
   a sun gear positioned on the axis in a central driving engagement relative to the plurality of planet gears, wherein rotation of the sun gear rotatably drives the planet gears;
   a ring gear extending around the planet gears so that each of the planet gears is drivably engaged with an interior side of the ring gear;
   a grip sleeve rotatably mounted to the ring gear for rotation about the central axis, the sun gear fixed axially within the grip sleeve; and
   a clamping structure having a tool bore shaped to receive a tool bit, the clamping structure being actuatable by motion of the ring gear to selectively clamp or release the tool bit from the axial tool bore;
   wherein an outer circumference of the ring gear has an external left-hand thread which mates to an internal left-hand thread on the base member.

8. A collet nut assembly adapted for holding a tool bit, the collet nut assembly adapted to be mounted to a shaft of a rotary power tool that rotates on a central axis, the collet nut assembly comprising:
   a base member adapted to be mounted to the shaft;
   a plurality of planet gears rotatably mounted to the base member, each of the planet gears radially spaced from the central axis;
   a sun gear positioned on the axis in a central driving engagement relative to the plurality of planet gears, wherein rotation of the sun gear rotatably drives the planet gears;
   a ring gear extending around the planet gears so that each of the planet gears is drivably engaged with an interior side of the ring gear;
   a grip sleeve rotatably mounted to the ring gear for rotation about the central axis, the sun gear fixed axially within the grip sleeve, wherein the grip sleeve includes a cylindrical wall portion and a radial wall portion that extends across an end of the cylindrical wall portion, wherein the sun gear is centrally mounted to the radial wall portion; and
   a clamping structure having a tool bore shaped to receive a tool bit, the clamping structure being actuatable by motion of the ring gear to selectively clamp or release the tool bit from the axial tool bore.

9. The collet nut assembly of claim 8, wherein the sun gear is integrally connected to the grip sleeve.

* * * * *